(12) United States Patent
Schwarte et al.

(10) Patent No.: US 6,342,274 B1
(45) Date of Patent: Jan. 29, 2002

(54) CLEAR POWDER COATING

(75) Inventors: Stephan Schwarte, Emsdetten; Joachim Woltering; Hubert Baumgart, both of Münster, all of (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/508,926

(22) PCT Filed: Aug. 29, 1998

(86) PCT No.: PCT/EP98/05511

§ 371 Date: May 8, 2000

§ 102(e) Date: May 8, 2000

(87) PCT Pub. No.: WO99/15598

PCT Pub. Date: Apr. 1, 1999

(30) Foreign Application Priority Data

Sep. 20, 1997 (DE) .......................... 197 41 555
Oct. 9, 1997 (DE) .......................... 197 44 561
Jul. 17, 1998 (DE) .......................... 198 32 106

(51) Int. Cl.$^7$ ................................. B05D 7/24
(52) U.S. Cl. ................ 427/485; 523/410; 523/412; 525/327.3; 525/375; 525/386
(58) Field of Search .................. 523/406, 410, 523/412; 525/327.3, 375, 386; 427/485

(56) References Cited

U.S. PATENT DOCUMENTS 5,965,213 A * 10/1999 Sacharski et al. ............ 427/475

FOREIGN PATENT DOCUMENTS

| EP | WO 96/32452 | 10/1996 | ......... C09D/133/06 |
| EP | WO 97/08235 | 3/1997 | ......... C08K/5/3492 |

* cited by examiner

*Primary Examiner*—Robert Dawson
*Assistant Examiner*—D. Aylward

(57) ABSTRACT

The present invention relates to a transparent powder coating material comprising a) at least one epoxy-containing binder with a content of from 20 to 45% by weight, preferably from 25 to 40% by weight of glycidyl-containing monomers and with or without a content of vinylaromatic compounds, preferably styrene, b) tris(alkoxycarbonylamino)triazine and polycarboxylic acids, preferably straight-chain aliphatic dicarboxylic acids and/or carboxy-functional polyesters, as crosslinking agents, and c) if desired, catalysts, auxiliaries, additives typical for transparent powder coating materials, such as degassing agents, levelling agents, UV absorbers, free-radical scavengers, antioxidants.

14 Claims, No Drawings

CLEAR POWDER COATING

The present invention relates to a transparent powder coating material which is particularly suitable as a coating for car bodies that are coated with waterborne coating material.

At present, liquid coating materials are preferably used for the coating of car bodies. These coating materials cause numerous environmental problems owing to their solvent content. This is true even when aqueous coating materials are employed.

For this reason, increased efforts have been made in recent years to use powder coating materials for the coating. The results to date, however, have been unsatisfactory; in particular, transparent powder coating materials still exhibit weaknesses in terms of chemical resistance and yellowing. Epoxy/carboxy-crosslinked transparent powder coatings exhibit a markedly poorer etch resistance relative to water, tree resin and sulphuric acid.

The object of the present invention is to provide a transparent powder coating material which relative to transparent powder coating materials known to date exhibits markedly better etch resistance and a reduced tendency towards yellowing after crosslinking. In this context, the transparent powder coating material should be able to be supplied for application in solid form.

This object is achieved by a transparent powder coating material comprising a) at least one epoxy-containing binder with or without a content of from 20 to 45% of glycidyl-containing monomers and with or without a content of vinylaromatic compounds, preferably styrene, b) tris(alkoxycarbonylamino)triazine and polycarboxylic acids, preferably straight-chain aliphatic dicarboxylic acids and/or carboxy-functional polyesters, as crosslinking agents, and c) if desired, catalysts, auxiliaries, additives typical for transparent powder coating materials, such as degassing agents, levelling agents, UV absorbers, free-radical scavengers, antioxidants.

The content of glycidyl-containing monomers is preferably from 25 to 45%. Particular preference is given to from 30 to 45% by weight, in particular from 30 to 40%. From 30 to 35% are very particularly preferred. Utmost preference is given to from 26 to 35%, especially from 27 to 33%.

The following proportions are preferred in this context:
a) 60–80 parts
b) 15–30 parts
c) 3–10 parts A suitable epoxy-functional binder for the solid transparent powder coating material comprises, for example, epoxy-functional polyacrylate resins which can be prepared by copolymerizing at least one ethylenically unsaturated monomer which contains at least one epoxy group in the molecule with at least one further ethylenically unsaturated monomer which contains no epoxy group in the molecule, at least one of the monomers being an ester of acrylic acid or methacrylic acid. Epoxy-functional polyacrylate resins of this kind are known, for example, from EP-A-299 420, DE-B-22 14 650, DE-B-27 49 576, U.S. Pat. No. 4,091,048 and U.S. Pat. No. 3,781,379.

Examples of ethylenically unsaturated monomers which contain no epoxy group in the molecule are alkyl esters of acrylic and methacrylic acid containing 1 to 20 carbon atoms in the alkyl radical, especially methyl acrylate, methyl methacrylate, ethyl acrylate, ethyl methacrylate, butyl acrylate, butyl methacrylate, 2-ethylhexyl acrylate and 2-ethylhexyl methacrylate. Further examples of ethylenically unsaturated monomers which contain no epoxy groups in the molecule are acid amides, such as acrylamide and methacrylamide, vinylaromatic compounds, such as styrene, methylstyrene and vinyltoluene, nitrites, such as acrylonitrile and methacrylonitrile, vinyl halides and vinylidene halides, such as vinyl chloride and vinylidene fluoride, vinyl esters, such as vinyl acetate, and hydroxyl-containing monomers, such as hydroxyethyl acrylate and hydroxyethyl methacrylate, for example.

The epoxy-functional monomers employed in the epoxy-functional binders are preferably glycidyl acrylate, glycidyl methacrylate and allyl glycidyl ether. The epoxy-functional polyacrylate resin normally has an epoxide equivalent weight of from 300 to 2500, preferably from 420 to 700, a number-average molecular weight (determined by gel permeation chromatography using a polystyrene standard) of from 2000 to 20,000, preferably from 3000 to 10,000, and a glass transition temperature ($T_g$) of from 30 to 80, preferably from 40 to 70 and, with particular preference, from 40 to 60° C. (measured with the aid of Differential Scanning Calorimetry (DSC)). Very particular preference is given to about 50° C. Mixtures of two or more acrylate resins can also be employed.

The epoxy-functional polyacrylate resin can be prepared by common and well-known methods, by addition polymerization.

As component (b), tris(alkoxycarbonylamino)triazines in accordance with U.S. Pat. No. 4,939,213, U.S. Pat. No. 5,084,541 and EP 0 624 577 are employed. Such compounds are also known from DE 2509561 and also Patent Abstracts of Japan, Publ. No. 09194769 A. However, the tris (alkoxycarbonylamino)triazines are employed therein only for cationic electrodeposition coating materials.

In accordance with the invention, the tris (alkoxycarbonylamino)triazines are of the formula

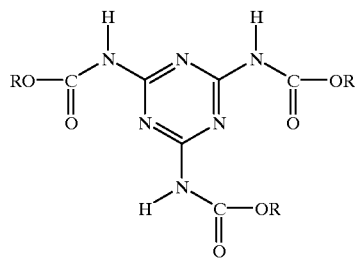

in which R=methyl, butyl, ethylhexyl groups. Derivatives of these compounds can also be employed.

The invention prefers the methyl/butyl mixed esters. These have the advantage over the plain methyl esters of better solubility in polymer melts, and butyl-ethylhexyl mixed esters. The plain butyl esters are also preferred in accordance with the invention.

The tris(alkoxycarbonylamino)triazines and their derivatives can also, in accordance with the invention, be employed in a mixture with conventional crosslinking agents (component C). Here, blocked polyisocyanates different from the tris(alkoxycarbonyl amino)triazines are particularly suitable. Similarly, it is possible to employ amino resins, e.g. melamines. The tris(alkoxycarbonylamino) triazines can be present in amounts of from 1 to 10, preferably from 2 to 10% by weight.

In principle it is possible to employ any amino resin suitable for transparent topcoats, or a mixture of such amino resins.

Resins of this kind are well known to the person skilled in the art and are offered as commercial products by numerous companies. Amino resins are condensation products of aldehydes, especially formaldehyde, and, for example, urea, melamine, guanamine and benzoguanamine. The amino resins contain alcohol groups, preferably methylol groups, some or all of which in general are etherified with alcohols.

Further suitable crosslinkers are carboxylic acids, especially saturated, straight-chain, aliphatic dicarboxylic acids having 3 to 20 carbon atoms in the molecule. It is very particularly preferred to employ dodecane-1,12-dioic acid. In order to modify the properties of the finished transparent powder coating materials, other carboxyl-containing crosslinkers may be employed if desired. As examples of these mention may be made of saturated branched or unsaturated straight-chain di- and polycarboxylic acids and of polymers having carboxyl groups.

Suitability extends to transparent powder coating materials which comprise an epoxy-functional crosslinker and an acid-functional binder.

Examples of suitable acid-functional binders are acidic polyacrylate resins which can be prepared by copolymerizing at least one ethylenically unsaturated monomer containing at least one acid group in the molecule with at least one further ethylenically unsaturated monomer containing no acid group in the molecule.

The epoxy-functional binder and the carboxyl-functional crosslinker and, respectively, the carboxyl binder and epoxy crosslinker are normally employed in an amount such that there are from 0.5 to 1.5, preferably from 0.75 to 1.25, equivalents of carboxyl groups per equivalent of epoxy groups. The amount of carboxyl groups present can be determined by titration with an alcoholic KOH solution.

In accordance with the invention the binder includes vinylaromatic compounds, especially styrene. In order to limit the risk of cracking on exposure to weathering, however, their content is not more than 35% by weight. Preference is given to from 10 to 25% by weight.

If desired, the solid powder coating materials include one or more suitable catalysts for curing the epoxy resin. Suitable catalysts are phosphonium salts of organic or inorganic acids, quaternary ammonium compounds, amines, imidazole and imidazole derivatives. The catalysts are generally employed in proportions of from 0.001% to about 2% by weight, based on the overall weight of the epoxy resin and of the crosslinking agent.

Examples of suitable phosphonium catalysts are ethyltriphenylphosphonium iodide, ethyltriphenylphosphonium chloride, ethyltriphenylphosphonium thio-cyanate, ethyltriphenylphosphonium acetate-acetic acid complex, tetrabutylphosphonium iodide, tetrabutylphosphonium bromide and tetrabutylphosphonium acetate-acetic acid complex. These and other suitable phosphonium catalysts are described, for example, in U.S. Pat. No. 3,477,990 and U.S. Pat. No. 3,341,580.

Examples of suitable imidazole catalysts are 2-styrylimidazole, 1-benzyl-2-methylimidazole, 2-methylimidazole and 2-butylimidazole. These and other imidazole catalysts are described, for example, in Belgian Patent No. 756,693.

In addition, the solid powder coating materials may also, if desired, comprise auxiliaries and additives. Examples thereof are levelling agents, antioxidants, UV absorbers, free-radical scavengers, flow aids and degassing agents, such as benzoin, for example.

The solid powder coating materials are prepared by known methods (cf. e.g. product information from BASF Lacke+Farben AG, "Pulverlacke" [powder coatings], 1990) by homogenization and dispersion by means, for example, of an extruder, screw kneading apparatus and the like. Following preparation of the powder coating materials, they are prepared for dispersion by grinding and, if desired, by classifying and sieving.

The average particle size of the powder coating materials of the invention lies between 1 and 25 $\mu$m, preferably below 20 $\mu$m and, with particular preference, from 2 to 10 $\mu$m.

The powder coating materials can be applied by the methods known from the prior art. In this context, use in the form of transparent coating materials is also suitable.

Stoving can be carried out at temperatures of as low as 130° C. It is possible to carry out stoving at from 130 to 180° C., preferably from 135 to 155° C.

It is surprising that with the crosslinker employed in accordance with the invention the etch resistance to water, tree resin and sulphuric acid is improved and the tendency towards yellowing is significantly reduced.

In the text below, the invention is described in more detail with reference to the examples:

1. PREPARING THE ACRYLATE RESIN 21.1 parts of xylene are introduced into a vessel and are heated to 130° C. The following components are metered into the initial charge at 130° C. over the course of 4 h by way of two separate feed containers: initiator: 4.5 parts of TBPEH (tert-butyl perethylhexanoate) mixed with 4.86 parts of xylene, and monomers: 10.78 parts of methyl methacrylate, 25.5 parts of n-butyl methacrylate, 17.39 parts of styrene and 23.95 parts of glycidyl methacrylate. The mixture is subsequently heated to 180° C. and the solvent is stripped off in vacuo <100 mbar.

2. PREPARING THE TRANSPARENT POWDER COATING MATERIAL

COMPARATIVE EXAMPLE 77.5 parts of acrylate resin, 18.8 parts of dodecanedioic acid, 2 parts of Tinuvin 1130 (UV absorber), 0.9 part of Tinuvin 144 (HALS), 0.4 part of Additol XL 490 (levelling agent) and 0.4 part of benzoin (degassing agent) are intimately mixed in a Henschel fluid mixer, the mixture is extruded on a BUSS PLK 46 extruder, the extrudate is ground in a Hosokawa ACM 2 mill, and the ground material is screened through a 125 $\mu$m sieve.

3. EXAMPLE 1

73.5 parts of acrylic resin, 17.8 parts of dodecanedioic acid, 5.0 parts of tris(alkoxycarbonylamino)triazine, 2 parts of Tinuvin 1130 (UV absorber), 0.9 part of Tinuvin 144 (HALS), 0.4 part of Additol XL 490 (levelling agent) and 0.4 part of benzoin (degassing agent) are intimately mixed in a Henschel fluid mixer, the mixture is extruded on a BUSS PLK 46 extruder, the extrudate is ground in a Hosokawa ACM 2 mill, and the ground material is screened through a 125 $\mu$m sieve.

4. APPLYING THE TRANSPARENT POWDER COATING MATERIAL

The transparent powder coating material is applied by means of electrostatic spray gun to steel panels coated with customary commercial electrodeposition coating material and black waterborne coating material. The panels are subsequently stoved for 30 minutes at a temperature of 140° C.

5. TESTING THE CHEMICAL RESISTANCE OF THE TRANSPARENT POWDER COATING MATERIALS

Tree resin (0.025 ml) and 1% strength $H_2SO_4$ (0.025 ml) are applied to the test panels, and the panels are subsequently subjected to the action of a gradient oven (from Byk) for 30 minutes. A note is made of the temperature at which initial damage occurs.

|  | Tree resin | $H_2SO_4$ |
| --- | --- | --- |
| Comparative Example | 37° C. | 47° C. |
| Inventive Example | 53° C. | 51° C. |

What is claimed is:

1. A transparent powder coating material comprising
   a) at least one epoxy-containing binder with a content of from 20 to 45% by weight of glycidyl-containing monomers,
   b) a crosslinking agent comprising from 1% to 10% by weight of a member selected from the group consisting of tris(alkoxycarbonylamino)triazines, derivatives of tris(alkoxycarbonylamino)triazines, and mixtures thereof, and further comprising at least one member selected from the group consisting of polycarboxylic acids, straight chain aliphatic dicarboxylic acids, carboxy-functional polyesters, and mixtures thereof, and
   c) optionally, one or more members selected from the group consisting of catalysts, auxiliaries, additives, degassing agents, leveling agents, UV absorbers, free-radical scavengers, antioxidants, and mixtures thereof.

2. The transparent powder coating material of claim 1, comprising from 25 to 45% by weight of glycidyl-containing monomers.

3. The transparent powder coating material of claim 2, comprising from 30 to 45% by weight of glycidyl-containing monomers.

4. The transparent powder coating material of claim 3, comprising from 30 to 35% by weight of glycidyl-containing monomers.

5. The transparent powder coating material of claim 1, wherein component (a) further comprises one or more vinylaromatic compounds.

6. The transparent powder coating material of claim 1, wherein component (a) comprises an epoxy-functional polyacrylate resin and the epoxy-functional monomers are selected from the group consisting of glycidyl acrylate, glycidyl methacrylate, allyl glycidyl ether, and mixtures thereof.

7. An aqueous dispersion, comprising
   a component A in the form of a solid powder coating, said component A comprising the transparent powder coating material of claim 1, and
   an aqueous component B.

8. The aqueous dispersion of claim 7, wherein aqueous component B comprises
   a) at least one nonionic thickener
   b) optionally, one or more members selected from the group consisting of catalysts, auxiliaries, defoamers, wetting agents, dispersing auxiliaries, carboxy-functional dispersants, antioxidants, UV absorbers, free-radical scavengers, biocides, solvent, leveling agents, neutralizing agents, amines, water retention agents, and mixtures thereof; and
   wherein the at least one epoxy-containing binder has a content of from 20% to less than 25% by weight of glycidyl containing monomers.

9. The aqueous dispersion of claim 7, having a pH of from 4.0 and 7.0, and wherein the at least one epoxy-containing binder has a content of from 20% to less than 25% by weight of glycidyl containing monomers.

10. The transparent powder coating material of claim 1 having a particle size of not more than 20 µm.

11. A method for coating uncoated and coated car bodies made from metal sheet and/or plastic by means of electrostatically assisted high-speed rotation or pneumatic application, comprising applying to a substrate the transparent powder coating material of claim 1.

12. The transparent powder coating material of claim 5, wherein component (a) comprises not more than 35 weight percent of one or more vinylaromatic compounds, based on component a).

13. The aqueous dispersion of claim 9 having a pH of from 5.5 and 6.5.

14. The transparent powder coating material of claim 10 having a particle size of from 2 to 10 µm.

* * * * *